United States Patent Office 3,641,103
Patented Feb. 8, 1972

3,641,103
PROCESS FOR PREPARING AMIDINE SALTS
Patricia M. Scanlon, Arlington, Mass., and Elwyn Richard Young, Nashua, N.H., assignors to W. R. Grace & Co., New York, N.Y.
No Drawing. Filed June 3, 1969, Ser. No. 830,091
Int. Cl. C07c 121/00
U.S. Cl. 260—465.4                    5 Claims

ABSTRACT OF THE DISCLOSURE

An amidine salt having a formula selected from the group consisting of $$NC-CH_2-N=(CH_2-C=NH)_2 \cdot 2HX$$
$$\quad\quad\quad\quad\quad\quad\quad\quad |$$
$$\quad\quad\quad\quad\quad\quad\quad\quad NH_2$$

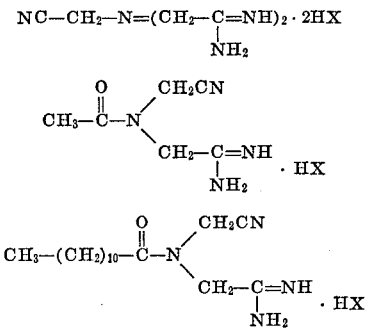

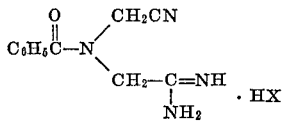

and

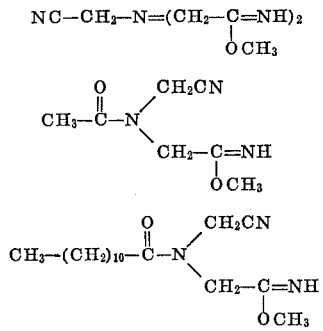

in which X is a bromide or chloride ion and to a method for preparing such salt, all as recited hereinafter.

In abstract, this invention is also directed to an imidoether having a formula selected from the group consisting of $$NC-CH_2-N=(CH_2-C=NH)_2$$
$$\quad\quad\quad\quad\quad\quad\quad\quad |$$
$$\quad\quad\quad\quad\quad\quad\quad\quad OCH_3$$

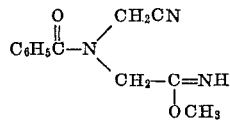

and to a method for preparing such ether; the amidine salts are useful stabilizers for polyesters.

BACKGROUND OF THE INVENTION

This invention is in the field of amidine salts and imidoethers including the preparation of such compounds.

Prior art methods for preparing amidine salts are taught by U.S. Pats. 2,375,740 and 3,309,374 and prior art methods for preparing imidoethers are taught by Carl R. Noller, "Chemistry of Organic Compounds," W. B. Saunders Company, Philadelphia, Pa., 1951, at pages 242–243.

SUMMARY OR THE INVENTION

In summary, this invention is directed to an amidine salt having a formula selected from the group consisting of $$NC-CH_2-N=(CH_2-C=NH)_2 \cdot 2HX$$
$$\quad\quad\quad\quad\quad\quad\quad\quad |$$
$$\quad\quad\quad\quad\quad\quad\quad\quad NH_2$$

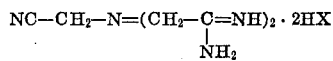

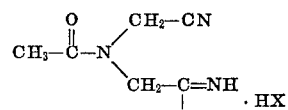

and

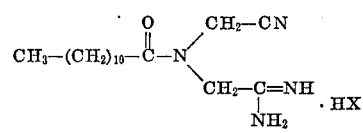

wherein X is an ion selected from the group consisting of chloride and bromide.

DESCRIPTION OF PREFERRED EMBODIMENTS

In a preferred embodiment this invention is directed to a process for preparing an amidine salt having a formula selected from the group consisting of

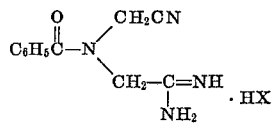

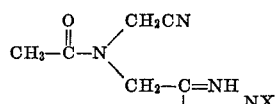

and

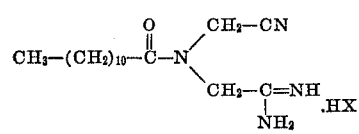

wherein X is an ion selected from the group consisting of chloride and bromide, comprising:

(a) forming a product mixture consisting essentially of the amidine salt and methanol by contacting and reacting at about 20–40° C. (preferably about 25–30° C.) an imidoether having a formula selected from the group consisting of

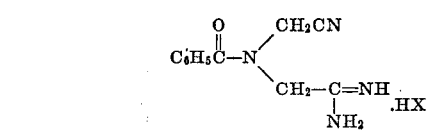

and

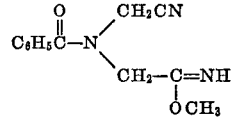

with an ammonium salt having the formula NH₄X, wherein X is an ion selected from the group consisting of chloride and bromide in the presence of methanol, the mole ratio of the imidoether to the methanol being about 1:20-60 (preferably about 1:20-40); the mole ratio of the imidoether to the ammonium salt being about 1:1-2, and the contact time being about 20 hours (preferably about 2-15 hours);

(b) separating the thus formed amidine salt from the methanol (e.g., by filtration, centrifugation, or decantation); and (c) recovering the separated amidine salt.

In another preferred embodiment this invention is directed to a process for preparing an amidine salt having the formula

NC—CH₂—N=(CH₂—C=NH)₂·2HX
            |
            NH₂ wherein X is an ion selected from the group consisting of chloride and bromide, comprising:

(a) forming a product mixture consisting essentially of the amidine salt and methanol by contacting and reacting at about 20-35° C. (preferably about 25-30° C.) an imidoether having the formula

NC—CH₂—N=(CH₂—C=N—H)₂
            |
            OCH₃ with an ammonium salt having the formula NH₄X, wherein X is an ion selected from the group consisting of chloride and bromide in the presence of methanol, the mole ratio of the imidoether to the methanol being about 1:15-30 (preferably about 1:10-25), the mole ratio of the imidoether to the ammonium salt being about 1:1-3 (preferably about 1:1-2), and the contact time being about 1-24 hours (preferably about 2-8 hours);

(b) separating the amidine salt from the methanol (e.g., by filtration, centrifugation, or decantation); and (c) recovering the separated amidine salt.

In another preferred embodiment this invention is directed to a process for preparing an imidoether having a formula selected from the group consisting of NC—CH₂—N=(CH₂—C=N—H)₂, 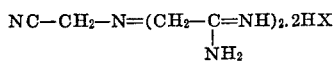
            |
            OCH₃

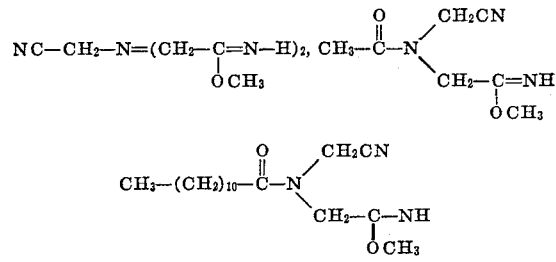

and

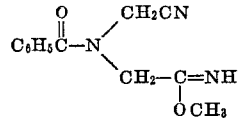

comprising:

(a) forming a product mixture consisting essentially of the imidoether, methanol, and sodium methoxide by contacting and reacting at about 0-30° C. (preferably at about 20-25° C.) methanol with a nitrile having a formula selected from the group consisting of

N≡(CH₂CN)₃

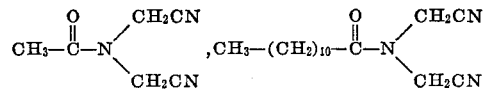

and 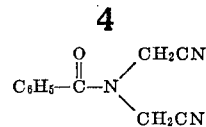

in the presence of a catalytic quantity of an alkali metal alkoxide, the mole ratio of the nitrile to the methanol being about 1:15-30 (preferably about 1:10-40); and (b) separating the imidoether from the methanol and alkali metal alkoxide (e.g., by filtration, centrifugation, or decantation—the imidoether being only slightly soluble in methanol and the alkali metal alkoxide being very substantially soluble in methanol). If desired, a quantity of methanol can be evaporated from the methanol-imidoether-alkali metal alkoxide mixture, thereby to decrease the volume of methanol present to dissolve the imidoether and thereby to increase the recovery of the imidoether.

GENERAL DESCRIPTION OF THE INVENTION

The amidine salts of this invention are obtained from α-amino nitriles by allowing the α-amino nitriles to react with methanol in the presence of a metal alkoxide to form an imidoether. The intermediate imidoether is then allowed to react with an ammonium salt in methanol to form the desired amidine salt.

The amidine salts of this invention are useful as stabilizers for polyesters, and the imidoethers of this invention are useful in the preparation of such amidine salts.

In the polyester art and polyester preparation art the term "stabilizer" has come to mean an additive which is effective in retarding or preventing polymerization of premixed polyester compositions prior to molding but which is substantially without effect upon polymerization under the conditions prevailing during molding where a catalyzed composition is subjected to elevated temperatures—such temperatures being well in excess of normal room temperatures of about 20-30° C. An "inhibitor" differs from a stabilizer primarily in that the inhibitor retards or prevents polymerization at normal room temperatures and at the elevated temperatures generally used in molding polyesters. In other words, stabilizers are effective in preventing or retarding the polymerization of premixed polyester compositions where such compoistions are stored at about normal room temperature without substantially retarding the catalyzed polymerization of such compositions under molding conditions (i.e., under elevated temperatures).

We have found that the imidoethers and amidine salts of this invention can be prepared from nitriles by a sequence of reactions represented by the following equations (where R is CH₃(CH₂)₁₀—, C₆H₅—, or CH₃—, and X is Cl⁻ or Br⁻):

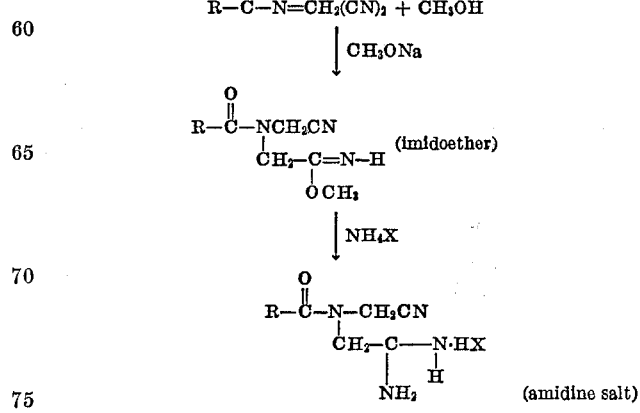

Where using nitrilotriacetonitrile as the nitrile the sequence of reactions is represented by the following equations (where X is Cl⁻ or Br⁻):

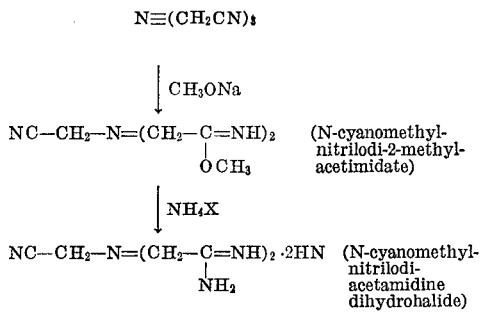

Our invention is further illustrated by the following specific but nonlimiting examples.

EXAMPLE I

Preparation of N-acetyliminodiacetonitrile

Acetyl chloride (78.5 g.; 1.0 mole) was added to a slurry of iminodiacetonitrile (190.2 g.; 2.0 moles) in 400 ml. of reagent grade acetone in a 1 liter flask fitted with a stirrer, thermometer, and reflux condesnder. The temperature was allowed to rise spontaneously during the addition of the acetyl chloride (maximum temperature 62°) and the reaction mixture was refluxed for 2 hours. After cooling, the product was collected by filtration, washed with acetone and air-dried. The filtrate was allowed to evaporate at room temperature leaving a gummy-like residue (147 g.) of crude N-acetyliminodiacetonitrile. (This material is a low melting solid, M.P. about 36–37° C.). The crude product was used in Example II, infra, for the preparation of an imidoether and an amidine salt.

EXAMPLE II

Preparation of N-acetyl-N-carboxamidinemethyl-glycinonitrile-hydrochloride

Crude N-acetyliminodiacetonitrile (79 g., 0.57 mole) was added to a solution of sodium methoxide (2.7 g. 0.057 mole) in 300 ml. anhydrous methanol in a 1 liter flask fitted with a stirrer, thermometer, and drying tube. The clear reaction mixture was stirred at room temperature for 2 hours. After standing overnight, the solid present was collected by filtration and air-dried. More solid was obtained by evaporation of the filtrate. A total of 54.5 g. (corresponding to a yield of 57% of theory) of crude imidoether was obtained. This material was identified by its infrared spectrum as N-acetyl-N-(2-methyl acetimidate)-glycinonitrile.

The crude imidoether (20.6 g.) was placed in a 250 ml. flask fitted with a stirrer, thermometer, and drying tube. Anhydrous methanol, 75 ml., was added and most of the solid dissolved. Ammonium chloride (7.0 g., 0.13 mole) was added on one portion. The reaction mixture was stirred for 2.5 hours, during which time a precipitate formed. After standing overnight, a pale yellow solid product was observed. This solid product was collected by filtration. It was washed with cold methanol, and air-dried. The product, which was identified as N-acetyl-N-carboxamidinemethyl-glycinonitrile-hydrochloride,

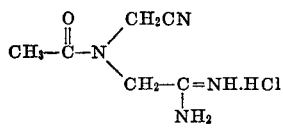

by its infrared spectrum and comparison of this spectrum with those of the other amidine salts described, weighed 15.7 g. (corresponding to a yield of 68% of theory).

EXAMPLE III

Preparation of N-lauroyl-N-carboxamidinemethyl-glycinonitrile hydrochloride

In a 1 liter flask fitted with a stirrer, thermometer, and drying tube was placed 109 g. (0.39 mole) of N-lauroyl-iminodiacetonitrile, 2 g. (0.04 mole) of sodium methoxide, and 500 ml. (ca. 12 moles) of anhydrous methanol. After stirring for approximately 20 minutes, all the solid dissolved. The clear, orange-yellow solution was stirred an additional 4.5 hours at room temperature. After standing overnight, a pale yellow solid was present. The solid was collected (by filtration) washed with ether and air-dried. Additional solid was recovered from the filtrate by evaporation. A total of 114 g. (corresponding to a yield of 94% of theory) of crude imidoether was obtained. This imidoether was identified as N-lauroyl-N-(2-methyl acetimidate)-glycinonitrile, by infrared and the determination of its equivalent weight. Titration of this sample with alcoholic HCl gave an equivalent weight of 322. The crude imidoether melted at ca. 88–93° C. and softened at 87° C.

Ammonium chloride (2.7 g.; 0.05 mole) was added with stirring to a slurry of 15.5 g. of the crude imidoether in 100 ml. of methyl alcohol. Solid was present throughout the stirring period (2 hours), and took on a silky-like appearance. The fluffy-white solid was collected, washed with ether and air-dried to give 14.7 g. (corresponding to a yield of 88% of theory) of crude product. This material did not melt up to 210°, but shrank and became progressively darker. The analyical sample was recrystallized from hot methanol. The crude product (3.0 g.) was dissolved in 60 cc. hot methanol and filtered. After standing overnight, the solid was collected, washed and dried to give 1.4 g. (47%) of dry material. This material was identified as N-lauroyl-N-carboxamidine-methyl-glycinonitrile hydrochloride by elemental analysis and by its infrared spectrum.

The elemental analysis was calculated for $C_{16}H_{31}N_4ClO$ (percent): C, 58.07; H, 9.44; N, 16.93; Cl, 10.71. Found (percent): C, 58.22; H, 9.42; N, 17.05; Cl, 10.78; corresponding to the formula

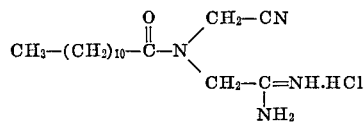

EXAMPLE IV

Preparation of N-benzoyl-N-carboxamidinemethyl-glycinonitrile hydrobromide

In a liter flask fitted with a stirrer, thermometer, and drying tube was placed 300 ml. of anhydrous methanol and 2 g. (0.04 mole) of sodium methoxide. N-benzolyl-iminodiacetonitrile (79.6 g.; 0.4 mole) was added and dissolved after stirring 15 minutes at room temperature. After stirring 7 hours and standing overnight, a yellowish solid was present. This was collected by centrifigation and air-dried. More solid was recovered by evaporation of the mother liquor. A total of 69.0 g. (corresponding to a yield of 75% of theory) of crude imidoether was obtained. This material was a yellow-tan solid which showed no definite melting point; the material darkened on heating and began to decompose at approximately 190°. Titration of the crude product gave an equivalent weight of 253. This material was identified as N-benzoyl-N-(2-methyl acetimidate)-glycinonitrile by infrared and the determination of its equivalent weight.

Ammonium bromide (10 g.; 0.11 mole) was added to a slurry of 23.1 g. of the crude imidoether in 250 ml. anhydrous methanol. The slurry was stirred magnetically for 3 hours and allowed to stand overnight. The pale yellow solid was collected by centrifugation, washed with cold methanol and dried in a desiccator. It was identified as N - benzoyl - N - carboxamidinemethyl - glycinonitrile hydrobromide by elemental analysis and by its infrared spectrum.

The elemental analysis was calculated for $C_{11}H_{13}N_4OBr$ (percent): C, 44.46; H, 4.41; N, 18.85. Found (percent): C, 43.94; H, 4.49; N, 18.58; corresponding to

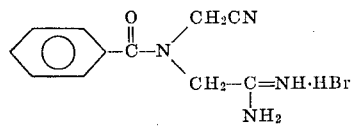

EXAMPLE V

Preparation of N-cyanomethyl nitrilodiacetamide dihydrobromide

Nitrilotriacetonitrile (26.8 g.; 0.2 mole) and sodium methoxide (0.02 mole) was stirred in 225 ml. methanol for 7 hours and allowed to stand overnight. Addition of ammonium bromide (59 g.; 0.6 mole) with stirring caused precipitation of a light tan solid. The reaction mixture was stirred an additional 2.5 hours, and the solid was then collected and dried, to give 59.2 g. (89.5%) of N - cyanomethyl - nitrilodiacetamidine dihydrobromide. The product was identified by elemental analysis and by infrared spectrum.

Since the product was shown to have the diamidine structure, $$NH-CH_2-N=(CH_2-\underset{\underset{NH_2}{|}}{C}=NH)_2 \cdot 2HBr$$

the intermediate imidoether was similarly identified as the diimidoether, $$NC-CH_2-N=(CH_2-\underset{\underset{OCH_3}{|}}{C}=NH)_2$$

N-cyanomethyl-nitrilodi-2-methylacetimidate.

What is claimed is:
1. An imidoether having a formula selected from the group consisting of

$$NC-CH_2-N=(CH_2-\underset{\underset{OCH_3}{|}}{C}=NH)_2$$

and

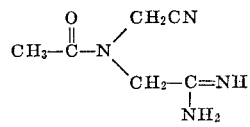

2. An amidine salt having a formula selected from the group consisting of $$NC-CH_2-N=(CH_2-\underset{\underset{NH_2}{|}}{C}=NH \cdot HX)_2$$

and

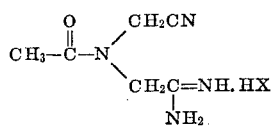

wherein X is an ion selected from the group consisting of chloride and bromide.

3. A process for preparing an imidoether having a formula selected from the group consisting of $$NC-CH_2-N=(CH_2-\underset{\underset{OCH_3}{|}}{C}=NH)_2$$

and

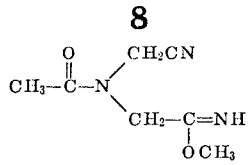

comprising:
(a) forming a product mixture consisting essentially of the imidoether, methanol, and sodium methoxide by contacting and reacting at about 0–30° C. methanol with a nitrile having a formula selected from the group consisting of $$N \equiv (CH_2CN)_3$$

and

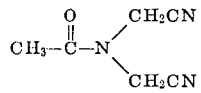

in the presence of a catalytic quantity of sodium methoxide, the mole ratio of the nitrile to the methanol being about 1:15–30, the mole ratio of the sodium methoxide to nitrile being about 1:10–50, and the contact time being about 4–105 hours;
(b) separating the imidoether from the methanol and sodium methoxide components of the product mixture; and
(c) recovering the separated imidoether.

4. A process for preparing an amidine salt having the formula $$NH-CH_2-N=(CH_2-\underset{\underset{NH_2}{|}}{C}=NH \cdot HX)_2$$

wherein X is a member selected from the group consisting of Cl and Br, comprising:
(a) forming a product mixture consisting essentially of the amidine salt and methanol by contacting and reacting at about 20–35° C. an imidoether having the formula $$NH-CH_2-N=(CH_2-\underset{\underset{OCH_3}{|}}{C}=N-H)_2$$

with an ammonium salt having the formula $NH_4X$, wherein X is a member selected from the group consisting of Cl and Br in the presence of methanol, the mole ratio of imidoether to methanol being about 1:15–30, the mole ratio of imidoether to ammonium salt being about 1:1–3; and the contact time being about 1–24 hours;
(b) separating the amidine salt from the methanol; and
(c) recovering the separated amidine salt.

5. A process for preparing an amidine salt having the formula

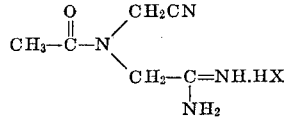

wherein X is a member selected from the group consisting of Cl and Br, comprising:
(a) forming a product mixture consisting essentially of the amidine salt and methanol by contacting and reacting at about 20–40° C. an imidoether having the formula

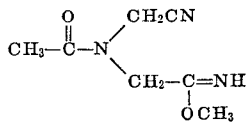

with an ammonium salt having the formula $NH_4X$, wherein X is a member selected from the group consisting of Cl and Br in the presence of methanol, the mole ratio of imidoether to methanol being about 1:20–60; the mole ratio of imidoether to ammonium salt being about 1:1–2, and the contact time being about 1–20 hours;

(b) separating the amidine salt from the methanol; and (c) recovering the separated amidine salt.

References Cited

UNITED STATES PATENTS 3,515,742   6/1970   Morgan et al. _____ 260—465.5

JOSEPH P. BRUST, Primary Examiner

U.S. Cl. X.R.

260—75 N, 404.5, 465 D, 465.5